US012008410B2

(12) United States Patent
Ando

(10) Patent No.: US 12,008,410 B2
(45) Date of Patent: Jun. 11, 2024

(54) SERVICE DEFINITION GENERATION USING PAIRED INFRASTRUCTURES

(71) Applicant: NEC Corporation, Tokyo (JP)

(72) Inventor: Kyohei Ando, Tokyo (JP)

(73) Assignee: NEC CORPORATION, Tokyo (JP)

( * ) Notice: Subject to any disclaimer, the term of this patent is extended or adjusted under 35 U.S.C. 154(b) by 380 days.

(21) Appl. No.: 17/398,189

(22) Filed: Aug. 10, 2021

(65) Prior Publication Data

US 2022/0050724 A1 Feb. 17, 2022

(30) Foreign Application Priority Data

Aug. 13, 2020 (JP) .................................. 2020-136765

(51) Int. Cl.
*G06F 9/50* (2006.01)
*G06F 11/34* (2006.01)

(52) U.S. Cl.
CPC ............ *G06F 9/5038* (2013.01); *G06F 9/505* (2013.01); *G06F 11/3433* (2013.01)

(58) Field of Classification Search
CPC ..... G06F 9/5038; G06F 9/505; G06F 11/3433
See application file for complete search history.

(56) References Cited

U.S. PATENT DOCUMENTS

| 2010/0235825 A1* | 9/2010 | Azulay ...................... G06F 8/65 718/1 |
| 2015/0089497 A1* | 3/2015 | Borzycki ............ G06F 9/45533 718/1 |
| 2016/0156671 A1* | 6/2016 | Cabrera .................. H04L 63/20 726/1 |
| 2019/0394302 A1* | 12/2019 | Kristiansson ......... H04L 9/3247 |
| 2020/0004983 A1* | 1/2020 | Chen ..................... H04L 9/0819 |
| 2020/0082071 A1* | 3/2020 | Cherny ................... G06F 21/45 |
| 2020/0235907 A1* | 7/2020 | Ponnuswamy ......... H04L 9/085 |
| 2020/0250372 A1* | 8/2020 | Remington ............. G06F 40/14 |
| 2021/0097477 A1* | 4/2021 | Zhang .................... G01N 21/90 |
| 2022/0413883 A1* | 12/2022 | Clebsch ............... H04L 63/123 |
| 2023/0068221 A1* | 3/2023 | Magowan .............. G06F 21/53 |

FOREIGN PATENT DOCUMENTS

JP 5378946 B2 12/2013
JP 2019-040327 A 3/2019

* cited by examiner

*Primary Examiner* — Benjamin C Wu

(57) ABSTRACT

An information processing system performs load distribution across a first infrastructure and a second infrastructure having mutually different billing systems. The first infrastructure pairs the first infrastructure with the second infrastructure, and generates a key pair including a private key used in the first infrastructure and a public key used in the second infrastructure, transfers, to the second infrastructure, an application definition input to a container cluster in the first infrastructure, by using the private key, and analyzes the application definition input to the container cluster in the first infrastructure to generate a load balancer definition and a reverse proxy definition. The second infrastructure analyzes the transferred application definition to generate a service definition.

7 Claims, 9 Drawing Sheets

FIG. 3

```
apiVersion: apps/v1
kind: Deployment
metadata:
  name: pod2-deployment
  labels:
    app: app2
    multiClusterAutoScaling: true    "WITH LOAD DISTRIBUTION" SETTING
spec:                                 (EXCLUSIVE FEATURE OF EXAMPLE
  replicas: 3                         EMBODIMENT OF PRESENT INVENTION)
  selector:
    matchLabels:
      app: app2
  template:
    metadata:
      labels:
        app: app2
    spec:
      containers:
      - name: app2
        image: app2:latest
        ports:
        - containerPort: 8080
```

```
apiVersion: apps/v1
kind: Deployment
metadata:
  name: pod1-deployment
  labels:
    app: app1
spec:
  replicas: 3
  selector:
    matchLabels:
      app: app1
  template:
    metadata:
      labels:
        app: app1
    spec:
      containers:
      - name: app1
        image: app1:latest
        ports:
        - containerPort: 8080
```

FIG. 4

```
apiVersion: v1
kind: ConfigMap
metadata:
    name: multi-cluster-auto-scale-config
data:
    pair.properties: |
        IP ADDRESS OF DEPLOYMENT OPERATION RECEPTION UNIT AT PAIRING DESTINATION=111.222.333.444
        PORT OF DEPLOYMENT OPERATION RECEPTION UNIT AT PAIRING DESTINATION=1234
    app2.properties: |
        MONITORING TIME (SECONDS)=10
        EXPANSION THRESHOLD (MILLISECONDS)=1000
        CONTRACTION THRESHOLD (MILLISECONDS)=800
        IP ADDRESS OF EXPANDED CLUSTER=111.222.333.444
        PORT OF EXPANDED CLUSTER=8080
    xxxx.properties: |
        ....
        ※ :MORE THAN ONE MAY BE WRITTEN IN
```

FIG. 7

```
apiVersion: apps/v1
kind: Deployment
metadata:
  name: pod1-deployment
  labels:
    app: app1
spec:
  replicas: 3
  selector:
    matchLabels:
      app: app1
  template:
    metadata:
      labels:
        app: app1
    spec:
      containers:
        - name: app1
          image: app1:latest
          ports:
            - containerPort: 8080
```

```
apiVersion: apps/v1
kind: Deployment
metadata:
  name: pod2-deployment
  labels:
    app: app2
    multiClusterAutoScaling: true
spec:
  replicas: 3
  selector:
    matchLabels:
      app: app2
  template:
    metadata:
      labels:
        app: app2
    spec:
      containers:
        - name: app2
          image: app2:latest
          ports:
            - containerPort: 8080
```

```
apiVersion: v1
kind: Service
metadata:
  name: app2-lb
spec:
  ports:
    - name: http
      port: 8080
      protocol: TCP
      targetPort: 8080
  selector:
    app: app2
  type: LoadBalancer
---
apiVersion: v1
kind: Pod
metadata:
  labels:
    app: app2
  name: app2-reverse-proxy
spec:
  containers:
    - name: nginx
      image: nginx:alpine
      ports:
        - containerPort: 8080
      volumeMounts:
        - name: reverse-proxy-config
          mountPath: /etc/nginx/nginx.conf
          subPath: nginx.conf
  volumes:
    - name: reverse-proxy-config
      configMap:
        name: reverse-proxy-conf
```

LOAD BALANCER AND REVERSE PROXY DEFINITIONS CORRESPONDING TO app2 "WITH LOAD DISTRIBUTION" GENERATED

FIG. 8

```
apiVersion: apps/v1
kind: Deployment
metadata:
  name: pod2-deployment
  labels:
    app: app2
  multiClusterAutoScaling: true
spec:
  replicas: 1    INITIAL VALUE OF MULTIPLICITY
                 SET TO 1 ON CLOUD SIDE
  selector:
    matchLabels:
      app: app2
  template:
    metadata:
      labels:
        app: app2
    spec:
      containers:
        - name: app2
          image: app2:latest
          ports:
            - containerPort: 8080
```

```
apiVersion: v1
kind: Service
metadata:
  name: app2-service
spec:
  type: NodePort
  selector:
    app: app2
  ports:
    - port: 8080          GENERATED FROM VALUE OF "Port OF EXPANDED CLUSTER"
      targetPort: 8080    IN SETTINGS INFORMATION
```

Service DEFINITION CORRESPONDING TO app2 "WITH LOAD DISTRIBUTION" GENERATED

NOTE: DEFINITION OF app1 WITHOUT LOAD DISTRIBUTION SETTINGS NOT INPUT ON CLOUD SIDE

SERVICE DEFINITION GENERATION USING PAIRED INFRASTRUCTURES

This application is based upon and claims the benefit of priority from Japanese patent application No. 2020-136765, filed on Aug. 13, 2020, the disclosure of which is incorporated herein in its entirety by reference.

TECHNICAL FIELD

The present invention relates to an information processing system, an information processing method and an infrastructure.

BACKGROUND ART

Japanese Patent Publication No. 5378946 (hereinafter Patent Document 1) describes a cluster system including a server management apparatus, a physical server group having a virtual server group, and a load distributor. In the cluster system described in Patent Document 1, the server management apparatus executes scale-in (a process of stopping the assigning of requests to one or more virtual servers constituting the cluster system and deleting the virtual servers from the cluster system) and scale-out (a process of adding one or more virtual servers to the cluster system and starting to assign requests to the added virtual servers).

Japanese Unexamined Patent Application, First Publication No. 2019-040327 (hereinafter Patent Document 2) describes an information processing system in which an on-premises environment and a cloud environment are connected via the internet. In the information processing system described in Patent Document 2, it is determined whether a process is to be executed in the on-premises environment or in the cloud environment. Additionally, in the information processing system described in Patent Document 2, a workflow switching unit receives the determination results and switches whether some or all of the processes constituting workflow are to be executed in the on-premises environment or in the cloud environment.

For example, in the information processing system described in Patent Document 2, if the mail transmission settings for mail transmission processes designate high confidentiality, then all of the processes in the workflow are executed in the on-premises environment, and if the mail transmission settings designate low confidentiality, then all of the processes in the workflow are executed in the cloud environment.

SUMMARY

Since the multiple physical servers constituting the physical server group described in Patent Document 1 are equivalent to each other, the technology described in Patent Document 1 cannot appropriately perform load distribution across two physical servers that are not equivalent to each other.

Additionally, Patent Document 2 does not describe specifically what kinds of processes should be performed between the on-premises environment and the cloud environment in order to appropriately perform load distribution across the on-premises environment and the cloud environment. For this reason, the technology described in Patent Document 2 also cannot appropriately perform load distribution across the on-premises environment and the cloud environment.

An example object of the present invention is to provide an information processing system, an information processing method and an infrastructure that solve the above-mentioned problems.

According to a first example aspect of the present invention, an information processing system is a system for performing load distribution across a first infrastructure and a second infrastructure having mutually different billing systems. The first infrastructure includes: at least one memory configured to store first instructions; and at least one processor configured to execute the first instructions to: pair the first infrastructure with the second infrastructure, and generate a key pair including a private key used in the first infrastructure and a public key used in the second infrastructure; transfer, to the second infrastructure, an application definition input to a container cluster in the first infrastructure, by using the private key; and analyze the application definition input to the container cluster in the first infrastructure to generate a load balancer definition and a reverse proxy definition. The second infrastructure includes: at least one memory configured to store second instructions; and at least one processor configured to execute the second instructions to: analyze the transferred application definition to generate a service definition.

According to a second example aspect of the present invention, an information processing method is a method for performing load distribution across a first infrastructure and a second infrastructure with mutually different billing systems. The information processing method includes: pairing, by the first infrastructure, the first infrastructure with the second infrastructure; generating, by the first infrastructure, a key pair including a private key used in the first infrastructure and a public key used in the second infrastructure; transferring, by the first infrastructure, to the second infrastructure, an application definition input to a container cluster in the first infrastructure, by using the private key; analyzing, by the first infrastructure, the transferred application definition input to the container cluster in the first infrastructure to generate a load balancer definition and a reverse proxy definition; and analyzing, by the first infrastructure, the transferred application definition to generate a service definition.

According to a third example aspect of the present invention, an infrastructure is included in an information processing system that performs load distribution across the infrastructure and another infrastructure with mutually different billing systems. The infrastructure includes: at least one memory configured to store instructions; and at least one processor configured to execute the instructions to: pair the infrastructure with the other infrastructure, and generate a key pair including a private key used in the infrastructure and a public key used in the other infrastructure; transfer, to the other infrastructure, an application definition input to a container cluster in the infrastructure, by using the private key; and analyze the application definition input to the container cluster in the infrastructure to generate a load balancer definition and a reverse proxy definition. The other infrastructure includes: at least one memory configured to store second instructions; and at least one processor configured to execute the second instructions to: analyze the transferred application definition to generate a service definition.

BRIEF DESCRIPTION OF THE DRAWINGS

FIG. 3 is a diagram indicating an example of an application definition input from a management terminal to a deployment operation reception unit.

FIG. 4 is a diagram indicating an example of the settings information indicated in FIG. 2.

FIG. 7 is a diagram indicating an example of an application definition input to a container cluster in an infrastructure (on-premises), with a load balancer definition and a reverse proxy definition added, by a constituent element insertion unit in the infrastructure (on-premises).

FIG. 8 is a diagram indicating an example of an application definition input to a container cluster in an infrastructure (cloud), with a service definition added, with Pod2 set to a multiplicity of 1, and the definition of Pod1 deleted, by a constituent element insertion unit in the infrastructure (cloud).

EXAMPLE EMBODIMENT

Hereinafter, example embodiments of the information processing system, the information processing method and the infrastructure according to the present invention will be explained with reference to the drawings.

First Example Embodiment

Figure 1:
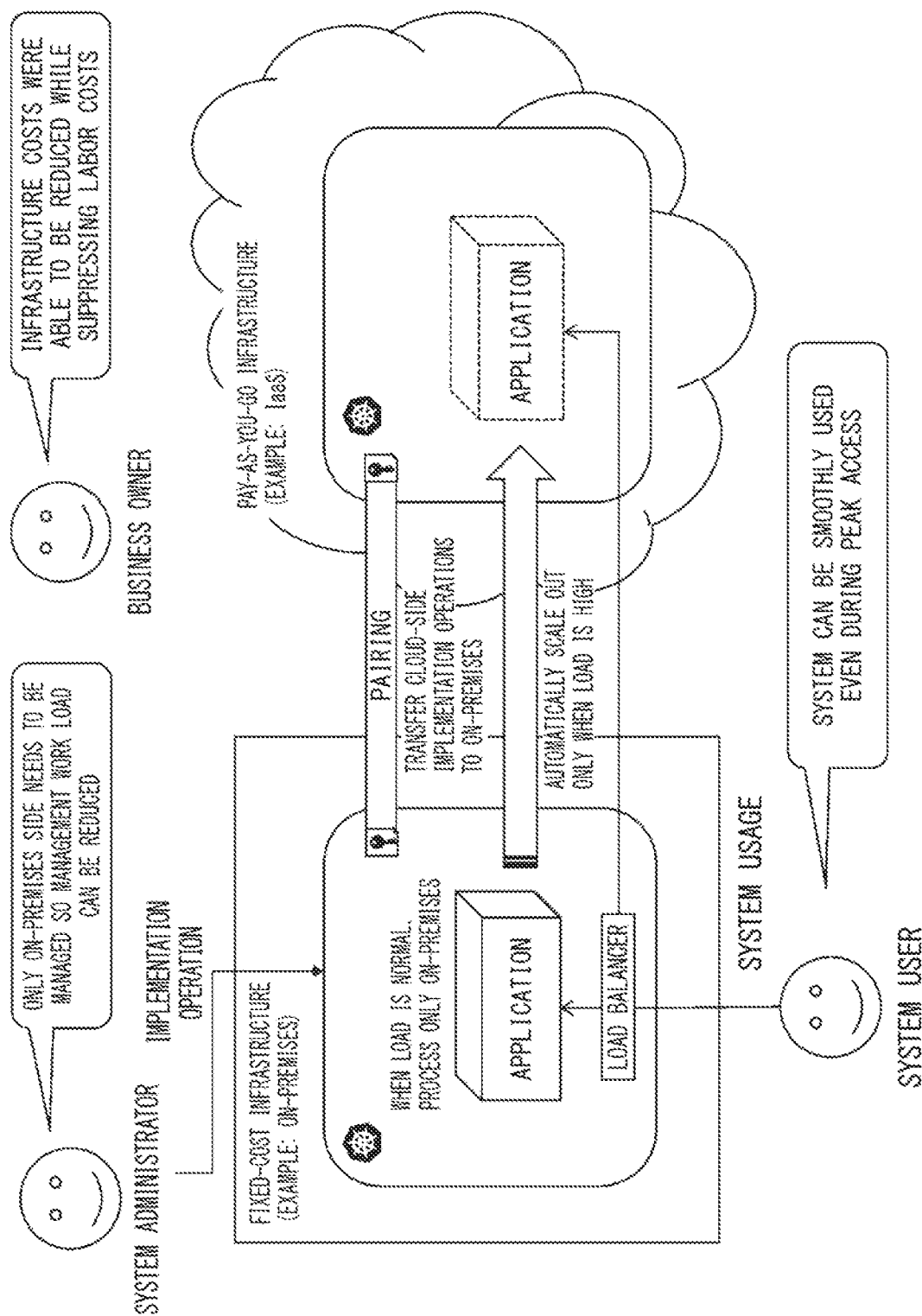
FIG. 1 is a diagram indicating features of an example of an information processing system according to a first example embodiment.

FIG. 1 is a diagram indicating the features (concepts) in an example of an information processing system 1 according to a first example embodiment. In the example indicated in FIG. 1, an application including a Pod1 (Pod-1) and a Pod2 (Pod-2) that runs on a Kubernetes (registered trademark) cluster is deployed in the information processing system 1 according to the first example embodiment. When there is a normal load, processing is performed only on-premises, in which the cost of use is fixed. If a peak access load is detected, Pod2 is scaled out to an infrastructure (cloud-side) in which the cost of use is based on pay-as-you-go billing. For this reason, a user of the information processing system 1 can smoothly use the information processing system 1 even during peak access.

In the example indicated in FIG. 1, if equipment with the same specifications is always used, then the on-premises cost is cheaper than the cloud-side cost. For this reason, the merit of reducing infrastructure cost can be obtained by performing processing only on-premises, in which the cost of use is fixed, when there is a normal load.

Figure 2:
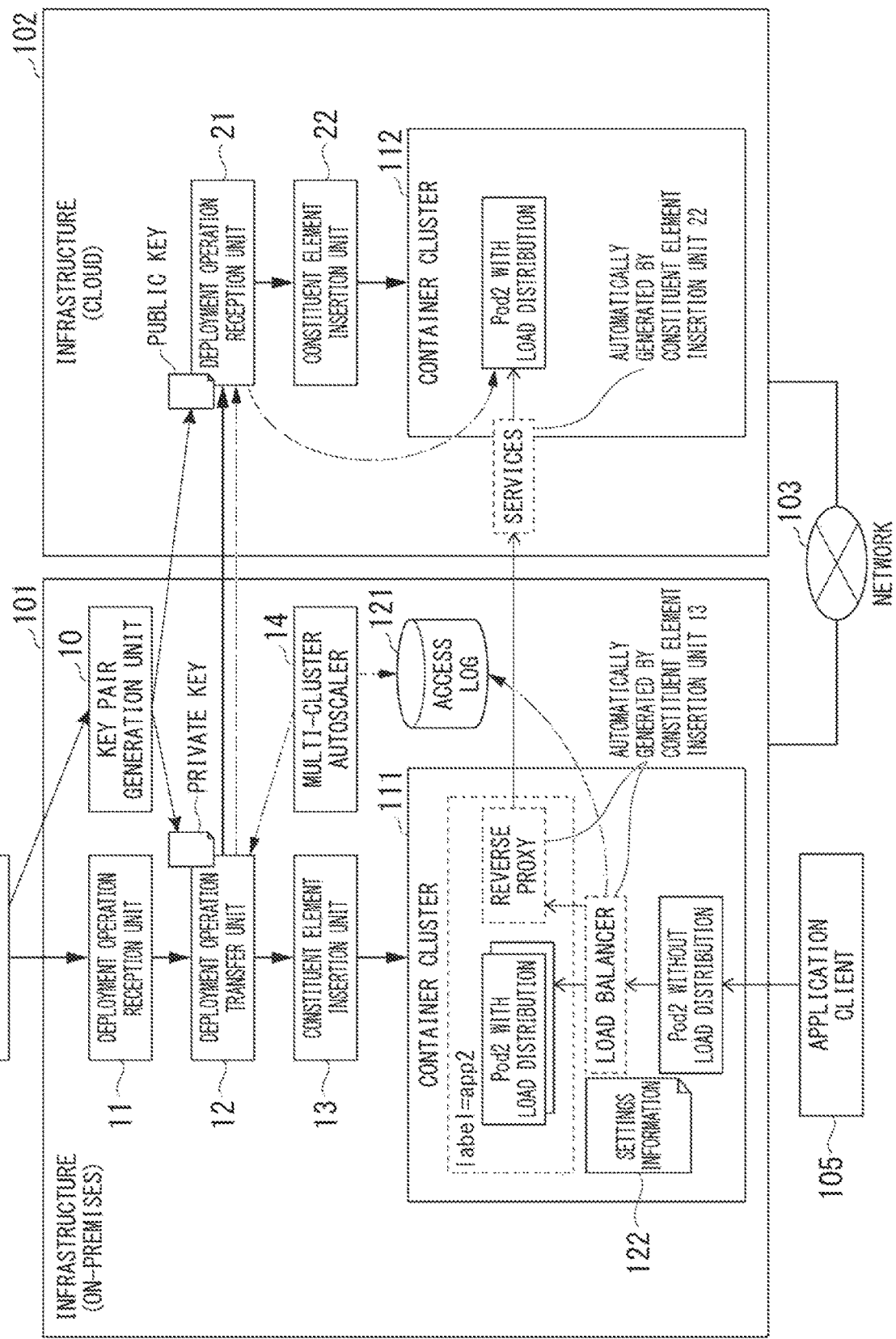
FIG. 2 is a diagram indicating an example of a configuration of the information processing system according to the first example embodiment.

FIG. 2 is a diagram indicating an example of the configuration of the information processing system 1 according to the first example embodiment.

In the example indicated in FIG. 2, the information processing system 1 performs load distribution across an infrastructure 101 and an infrastructure 102 having mutually different billing systems. The information processing system 1 includes a fixed-cost infrastructure (on-premises) 101, a pay-as-you-go infrastructure (cloud) 102, a network 103, a management terminal 104, and an application client 105. The infrastructure 101 and the infrastructure 102 are connected via a high-speed network 103 by means of dedicated cables or the like. Implementation operations and requests by a load balancer are transferred via the network 103.

In the infrastructure 101, a container cluster 111 is constructed by means of Kubernetes. In the infrastructure 102, a container cluster 112 is constructed by means of Kubernetes. In the infrastructure 101, a log of requests from the application client 105 is collected in an access log 121. The management terminal 104 is used by the administrator of the information processing system 1.

The infrastructure (on-premises) 101 includes a key pair generation unit 10, a deployment operation reception unit 11, a deployment operation transfer unit 12, a constituent element insertion unit 13, and a multi-cluster autoscaler 14.

The key pair generation unit 10 pairs the infrastructure 101 with the infrastructure 102, and generates a key pair including a private key used in the infrastructure 101 and a public key used in the infrastructure 102.

The deployment operation reception unit 11 receives inputs of application definitions from the management terminal 104. Additionally, the deployment operation reception unit 11 hands over the application definitions that have been input from the management terminal 104 to the deployment operation transfer unit 12.

FIG. 3 is a diagram indicating an example of an application definition input from the management terminal 104 to the deployment operation reception unit 11.

In the example indicated in FIG. 3, a "With load distribution" setting (multiClusterAutoScaling: true) is included in the application definition input from the management terminal 104 to the deployment operation reception unit 11.

In the example indicated in FIG. 2, the deployment operation transfer unit 12 uses the private key generated by the key pair generation unit 10 to transfer, to the infrastructure 102, the application definition handed over from the deployment operation reception unit 11.

The constituent element insertion unit 13 analyzes the application definition input to the container cluster 111 in the infrastructure 101 (in other words, the application definition input from the management terminal 104 to the deployment operation reception unit 11 and handed over from the deployment operation reception unit 11 to the deployment operation transfer unit 12), and generates a load balancer definition and a reverse proxy definition.

The multi-cluster autoscaler 14 monitors an access log 121 output from a load balancer in the container cluster 111 in the infrastructure 101.

The infrastructure (cloud) 102 includes a deployment operation reception unit 21 and a constituent element insertion unit 22.

The deployment operation reception unit 21 uses the public key generated by the key pair generation unit 10 to receive the application definition transferred by the deployment operation transfer unit 12.

The constituent element insertion unit 22 analyzes the application definition transferred by the deployment operation transfer unit 12 and generates a service definition.

In other words, the application definition input to the container cluster 111 in the infrastructure 101 and the application definition transferred to the infrastructure 102 by means of the deployment operation transfer unit 12 include settings for load distribution across the infrastructure 101 and the infrastructure 102.

The settings information 122 defines settings necessary for operating the key pair generation unit 10, the deployment operation reception unit 11, the deployment operation transfer unit 12, the constituent element insertion unit 13, the multi-cluster autoscaler 14, the deployment operation reception unit 21, and the constituent element insertion unit 22. The settings information 122 is stored in the container cluster 111.

FIG. 4 is a diagram indicating an example of the settings information 122 indicated in FIG. 2.

In the example indicated in FIG. 4, the below-mentioned monitoring unit time (monitoring interval) is set to 10 seconds, the below-mentioned expansion threshold value is set to 1000 milliseconds and the below-mentioned contraction threshold value is set to 800 milliseconds.

Figure 5:
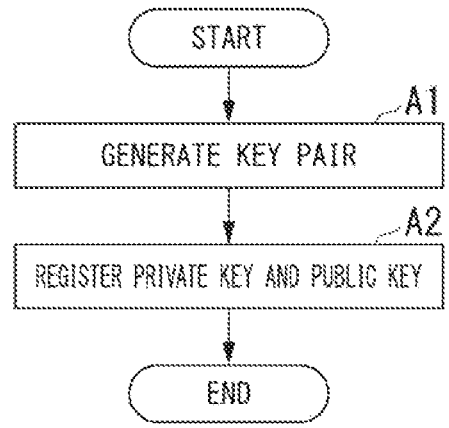
FIG. 5 is a flow chart indicating an example of the processes executed in a key pair generation unit.

FIG. 5 is a flow chart indicating an example of the processes executed in the key pair generation unit 10. Specifically, FIG. 5 is a flow chart indicating an example of the processing performed when a system administrator uses the management terminal 104 to pair the container cluster 111 in the infrastructure (on-premises) 101 with the container cluster 112 in the infrastructure (cloud) 102.

In the example indicated in FIG. 5, in step A1, the key pair generation unit 10 generates a key pair including a private key used in the infrastructure 101 and a public key used in the infrastructure 102. Specifically, in step A1, the system administrator uses the management terminal 104 to access the key pair generation unit 10, and the key pair generation unit 10 generates a key pair by means of public key encryption. Next, in step A2, the key pair generation unit 10 registers the private key in the deployment operation transfer unit 12 in the infrastructure 101, and registers the public key in the deployment operation reception unit 21 in the infrastructure 102.

By using this key pair, an authentication process between the deployment operation transfer unit 12 and the deployment operation reception unit 21, to be explained below, and a communication content encryption process are performed.

Figure 6:
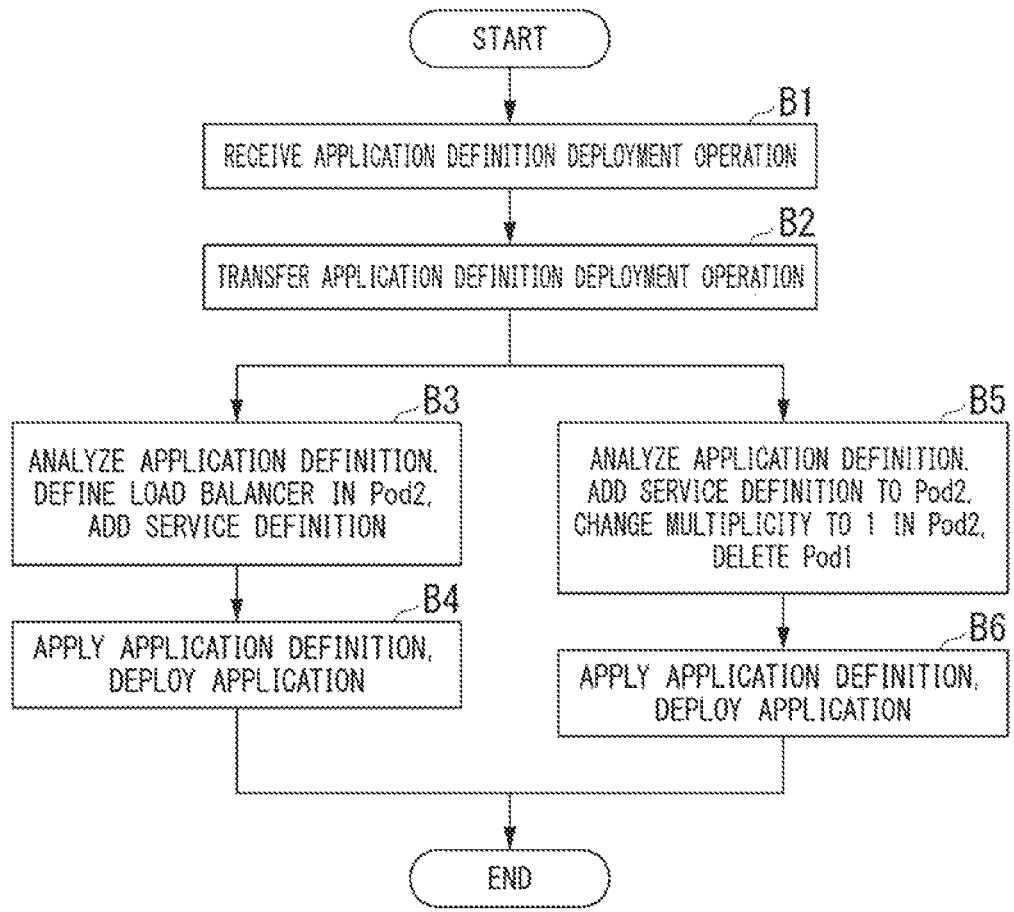
FIG. 6 is a flow chart indicating an example of the processes executed in the information processing system according to the first example embodiment in the case in which a system administrator registers an application definition including load distribution settings.

FIG. 6 is a flow chart indicating an example of the processes executed in the information processing system 1 according to the first example embodiment when a system administrator registers an application definition including a load distribution setting.

In the example indicated in FIG. 6, in step B1, the management terminal 104 used by the system administrator inputs the application definition indicated in FIG. 3 to the deployment operation reception unit 11. In the example indicated in FIG. 3, the application definition input to the deployment operation reception unit 11 includes Pod1 and Pod2. Additionally, the application definition input to the deployment operation reception unit 11 includes a setting for load distribution across the infrastructure (on-premises) 101 and the infrastructure (cloud) 102. Specifically, the load distribution setting is defined in only Pod2.

Next, in step B2, the deployment operation reception unit 11 hands over the application definition input from the management terminal 104 to the deployment operation transfer unit 12. Additionally, the deployment operation transfer unit 12 uses the private key generated by the key pair generation unit 10 to transfer the application definition to the deployment operation reception unit 21 in the infrastructure 102.

In other words, the application definition input to the container cluster 111 in the infrastructure 101 and the application definition transferred to the infrastructure (cloud) 102 by the deployment operation transfer unit 12 include Pod1 and Pod2.

Of Pod1 and Pod2 included in the application definitions, only Pod2 includes a setting for load distribution across the infrastructure (on-premises) 101 and the infrastructure (cloud) 102.

In the infrastructure (on-premises) 101, in step B3, the constituent element insertion unit 13 analyzes the application definition and generates a load balancer definition corresponding to Pod2, which has a load distribution setting, and a reverse proxy definition for transferring the application definition to the infrastructure (cloud) 102. Additionally, the constituent element insertion unit 13 adds the generated load balancer definition and reverse proxy definition to the application definition input to the container cluster 111 in the infrastructure 101.

In other words, of Pod1 and Pod2, the load balancer definition generated by the constituent element insertion unit 13 corresponds to Pod2, which includes a setting for load distribution across the infrastructure 101 and the infrastructure 102.

The reverse proxy definition generated by the constituent element insertion unit 13 is used to transfer, to the infrastructure 102, the application definition that is input to the container cluster 111 in the infrastructure 101.

FIG. 7 is a diagram indicating an example of the application definition input to the container cluster 111 in the infrastructure 101, with the load balancer definition and the reverse proxy definition added, by the constituent element insertion unit 13.

In the example indicated in FIG. 7, the load balancer definition and the reverse proxy definition are added to the application definition indicated in FIG. 3.

In the example indicated in FIG. 6, next, in step B4, the constituent element insertion unit 13 deploys the application by applying, to the container cluster 111 in the infrastructure (on-premises) 101, the application definition to which the load balancer definition and the reverse proxy definition were added in step B3.

In the infrastructure (cloud) 102, in step B5, the constituent element insertion unit 22 analyzes the application definition transferred from the deployment operation transfer unit 12 to the deployment operation reception unit 21. Additionally, the constituent element insertion unit 22 generates a service definition corresponding to Pod2, which has the load distribution setting, sets Pod2, which has the load distribution setting, to a multiplicity of 1, and deletes the definition of Pod1 (i.e., an unneeded definition), which does not have a load distribution setting.

FIG. 8 is a diagram indicating an example of the application definition input to the container cluster 112 in the infrastructure 102 with a service definition added, with Pod2 set to a multiplicity of 1, and the definition of Pod1 deleted, by the constituent element insertion unit 22.

In the example indicated in FIG. 8, a service definition is added to the application definition indicated in FIG. 3. Additionally, the multiplicity is set to 1 in Pod2. Furthermore, the definition of Pod1 is deleted from the application definition indicated in FIG. 3.

Of Pod1 and Pod2, the service definition generated by the constituent element insertion unit 22 corresponds to the aforementioned Pod2, which includes a setting for load distribution across the infrastructure (on-premises) 101 and the infrastructure (cloud) 102.

In the example indicated in FIG. 6, next, in step B6, the constituent element insertion unit 22 deploys the application by applying, to the container cluster 112 in the infrastructure (cloud) 102, the application definition to which the service definition was added, Pod2 was set to a multiplicity of 1, and the definition of Pod1 was deleted in step B5.

In other words, the constituent element insertion unit 22 deploys the application by applying, to the container cluster 112, the application definition transferred by the deployment operation transfer unit 12.

In other words, in the example indicated in FIG. 6, the constituent element insertion unit 13 generates the load balancer definition and the reverse proxy definition before deploying the application. Additionally, the constituent element insertion unit 22 generates the service definition before deploying the application.

Figure 9:
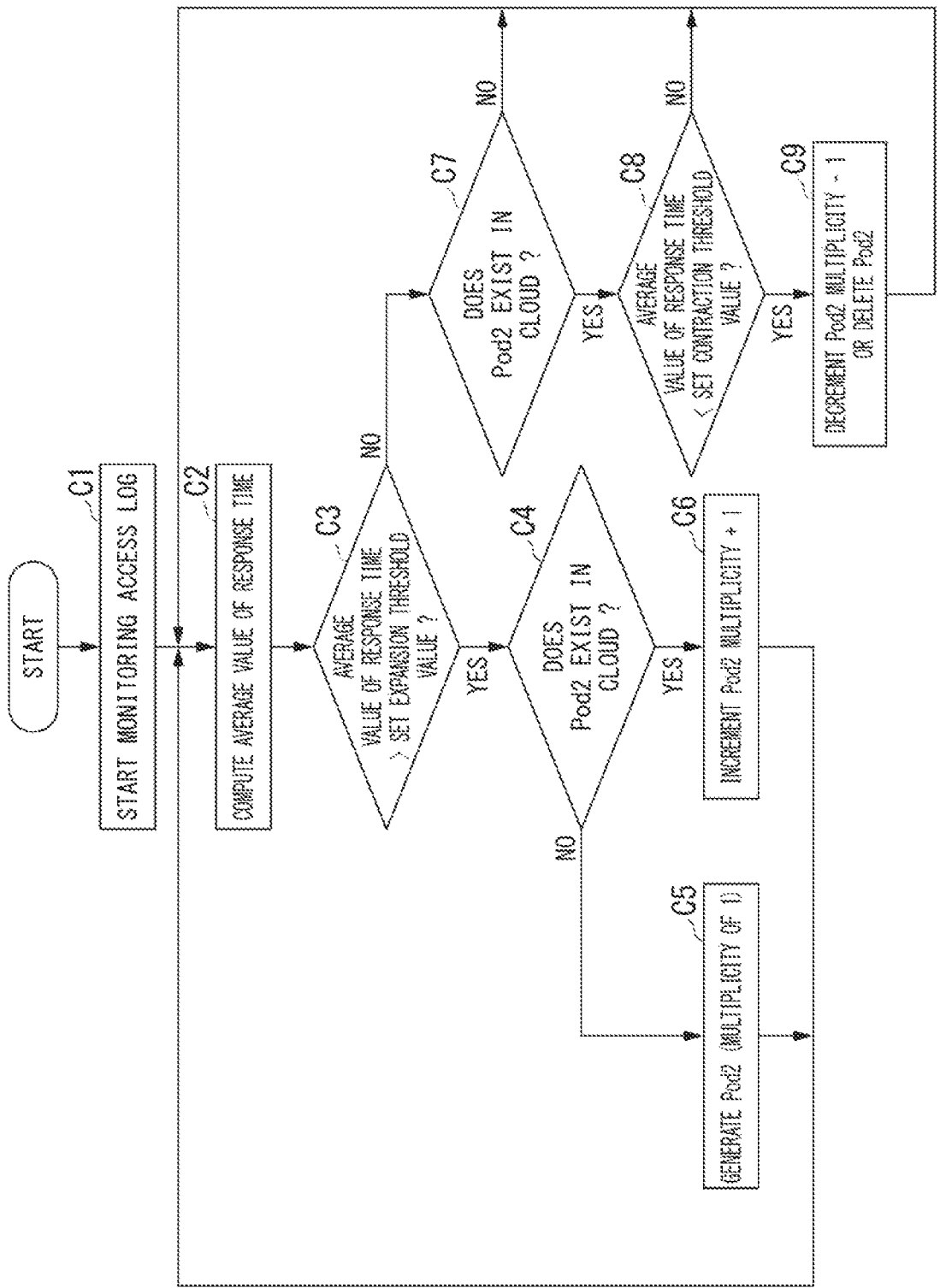
FIG. 9 is a flow chart indicating an example of the processes executed by a multi-cluster autoscaler or the like during implementation of the information processing system according to the first example embodiment.

FIG. 9 is a flow chart indicating an example of the processes executed by the multi-cluster autoscaler 14 or the like during implementation of the information processing system 1 according to the first example embodiment.

In the example indicated in FIG. 9, in step C1, the multi-cluster autoscaler 14 begins monitoring the access log 121 output by the load balancer in the container cluster 111 in the infrastructure 101. Specifically, the multi-cluster autoscaler 14 acquires the access log 121 output by the load balancer in each monitoring interval (monitoring unit time) set as indicated in FIG. 4.

Next, in step C2, the multi-cluster autoscaler 14 computes the average value of the response time of an application in the range of the monitoring interval (monitoring unit time) set in Pod2 deployed in the container cluster 111 in the infrastructure (on-premises) 101.

Next, in step C3, the multi-cluster autoscaler 14 determines whether or not the average value of the response time computed in step C2 is greater than the expansion threshold value set as indicated in FIG. 4. If the average value of the response time is greater than the set expansion threshold value, then the procedure advances to step C4, and if the average value of the response time is less than or equal to the set expansion threshold value, then the procedure advances to step C7.

In step C4, the multi-cluster autoscaler 14 determines whether or not Pod2 exists on the cloud side, in other words, whether or not Pod2 exists in the container cluster 112 in the infrastructure (cloud) 102. If Pod2 does not exist in the container cluster 112 in the infrastructure 102, then the procedure advances to step C5, and if Pod2 exists in the container cluster 112 in the infrastructure 102, then the procedure advances to step C6.

In step C5, the multi-cluster autoscaler 14 causes the Pod2 deployed in the container cluster 112 in the infrastructure 102 to be generated via the deployment operation transfer unit 12 and the deployment operation reception unit 21. In other words, the information processing system 1 generates the Pod2 in the container cluster 112 in the infrastructure 102. The multiplicity in Pod2, which is generated by the information processing system, is set to +1.

In step C5, the multi-cluster autoscaler 14 increments the multiplicity of Pod2, which is deployed in the container cluster 112 in the infrastructure (cloud) 102, by +1, via the deployment operation transfer unit 12 and the deployment operation reception unit 21.

In other words, if the average value of the response time computed in step C2 is greater than the set expansion threshold value, then the multiplicity of the load distribution is raised.

In step C7, the multi-cluster autoscaler 14 determines whether or not Pod2 exists on the cloud side, in other words, whether or not Pod2 exists in the container cluster 112 in the infrastructure (cloud) 102. If Pod2 does not exist in the container cluster 112 in the infrastructure 102, then the procedure returns to step C2. Conversely, if Pod2 exists in the container cluster 112 in the infrastructure 102, then the procedure advances to step C8.

In step C8, the multi-cluster autoscaler 14 determines whether or not the average value of the response time computed in step C2 is less than the contraction threshold value set as indicated in FIG. 4. If the average value of the response time is less than the set contraction threshold value, then the procedure advances to step C9, and if the average value of the response time is greater than or equal to the set contraction threshold value, then the procedure returns to step C2.

In step C9, the multi-cluster autoscaler 14 decrements the multiplicity of Pod2, which is deployed in the container cluster 112 in the infrastructure (cloud) 102, by −1, via the deployment operation transfer unit 12 and the deployment operation reception unit 21. Alternatively, if the multiplicity of Pod2 in the container cluster 112 in the infrastructure 102 cannot be decremented, then Pod2 in the container cluster 112 in the infrastructure 102 is deleted.

In other words, if the average value of the response time computed in step C2 is less than the set contraction threshold value, then the multiplicity of the load distribution is lowered.

The cost of infrastructure can be optimized, for example, by performing processes on-premises when there is a normal load and distributing the load of the processes to on-demand cloud services in spot operation only when there is a peak load. However, there is a problem in that such a configuration complicates the system, so that design, construction and implementation costs are increased more than the reduced infrastructure costs.

According to the information processing system 1 in the first example embodiment, the design, construction and implementation costs for a load distribution configuration across infrastructures can be suppressed, thus allowing the merits of infrastructure cost reduction to be enjoyed.

In other words, according to the information processing system 1 in the first example embodiment, a configuration for dynamically load-distributing the work load on a fixed-cost infrastructure (for example, a physical server installed on-premises) to an on-demand infrastructure (for example, an IaaS such as Amazon EC2) can be realized by means of only settings and implementation operations on one side.

If the same applications are deployed on two different infrastructures (for example, on-premises and cloud), and scale-out settings and load balancer settings for load distribution are manually designed every time, then other costs as indicated below will exceed the infrastructure cost reduction effects.

First, if load distribution across infrastructures is to be installed at many sites in a system, then the system configuration becomes complicated, and the design costs and maintenance costs increase.

Additionally, there is a need to implement and manage two infrastructures as compared with a system configuration with just one infrastructure. Thus, the implementation cost becomes large.

Due to the introduction of Kubernetes, which is a container orchestration tool, the implementation operations of container-type applications in all types of infrastructures have been standardized, and it has become easy to insert needed software components.

Therefore, in the information processing system 1 of the first example embodiment, in order to solve the above-mentioned problems of the design cost, the maintenance cost and the implementation cost, the automated construction of an on-premises/cloud load distribution configuration by implementation operations on only the on-premises side is realized due to the three features indicated below.

First, in the information processing system 1 of the first example embodiment, on-premises and cloud clusters are paired, and keys are exchanged between the paired clusters in order to allow operations on-premises to be reflected in the cloud as well.

Additionally, in accordance with load distribution activation settings, constituent elements (load balancer, service and autoscaler settings) that are needed in the Pods deployed in the Kubernetes clusters are automatically inserted.

Furthermore, as a measure that is common to both the on-premises and cloud infrastructures, which have different equipment specifications, the "response time" is used as a reference to perform SLA (service level agreement)-based autoscaling. In the load balancer, the response time is monitored (SLA monitoring), and if the average value in a certain time period exceeds a threshold value, scale-out across clusters is executed.

As examples of typical infrastructures (on-premises) for which implementation operations are standardized by means of Kubernetes and to which the information processing system 1 of the first example embodiment may be applied, there are the following:

Kubernetes
Red Had OpenShift Container Platform
IBM Cloud Paks
VMware Tanzu Kubernetes Grid Additionally, as examples of typical infrastructures (cloud services) to which the information processing system 1 of the first example embodiment may be applied, there are the following:

Amazon EKS
Azure Kubernetes Service
Google Kubernetes Engine

Second Example Embodiment

Hereinafter, a second example embodiment of the information processing system, the information processing method and the infrastructure according to the present invention will be explained.

The information processing system 1 according to the second example embodiment is configured similarly to the information processing system 1 according to the first example embodiment explained above, aside from the points mentioned below. Therefore, with the information processing system 1 according to the second example embodiment, advantageous effects similar to those of the information processing system 1 according to the first example embodiment explained above can be obtained, aside from the points mentioned below.

The information processing system 1 according to the first example embodiment performs load distribution across the infrastructure (on-premises) 101 and the infrastructure (cloud) 102 having mutually different billing systems.

In contrast therewith, the information processing system 1 according to the second example embodiment performs load distribution across an infrastructure (on-premises) 101 and an infrastructure (on-premises) 102 having mutually different billing systems.

In an example of the information processing system according to the second example embodiment, the infrastructure (on-premises) 101 is, for example, physical HW (hardware) or a stationarily deployed virtual machine, and the infrastructure (on-premises) 102 is, for example, a private cloud.

Third Example Embodiment

Hereinafter, a third example embodiment of the information processing system, the information processing method and the infrastructure according to the present invention will be explained.

The information processing system 1 according to the third example embodiment is configured similarly to the information processing system 1 according to the first example embodiment explained above, aside from the points mentioned below. Therefore, with the information processing system 1 according to the third example embodiment, advantageous effects similar to those of the information processing system 1 according to the first example embodiment explained above can be obtained, aside from the points mentioned below.

The information processing system 1 according to the third example embodiment performs load distribution across an infrastructure (cloud) 101 and an infrastructure (cloud) 102 having mutually different billing systems.

In an example of the information processing system 1 according to the third example embodiment, the infrastructure (cloud) 101 is, for example, a cloud service with a billing system that provides a discount on long-term use (for example, reserved instances on AWS (Amazon Web Services), sustained use discounts on GCP (Google Cloud Platform), etc.), and the infrastructure (cloud) 102 is, for example, a pay-as-you-go cloud service.

Fourth Example Embodiment

Hereinafter, a fourth example embodiment of the information processing system, the information processing method and the infrastructure according to the present invention will be explained.

The infrastructure 101 according to the fourth example embodiment is configured similarly to the infrastructure 101 according to the first example embodiment explained above, aside from the points mentioned below. Therefore, with the infrastructure 101 according to the fourth example embodiment, advantageous effects similar to those of the infrastructure 101 according to the first example embodiment explained above can be obtained, aside from the points mentioned below.

Figure 10:
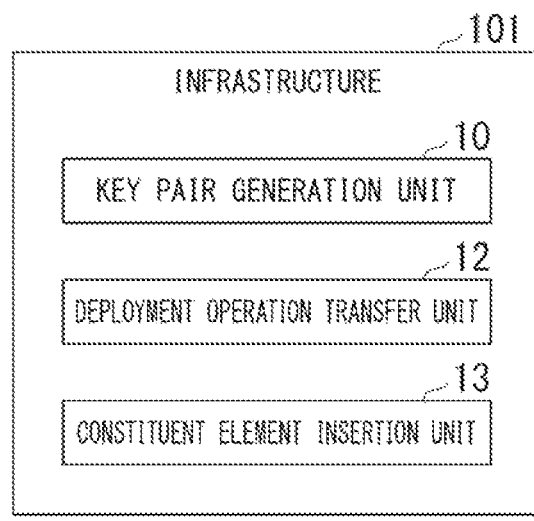
FIG. 10 is a diagram indicating an example of the configuration of an infrastructure according to a fourth example embodiment.

FIG. 10 is a diagram indicating an example of a configuration of the infrastructure 101 according to the fourth example embodiment.

In the example indicated in FIG. 10, the information processing system 1 (see FIG. 2) including the infrastructure 101 performs load distribution across an infrastructure 101 and an infrastructure 102 (see FIG. 2) having mutually different billing systems. The information processing system 1 includes the infrastructure 101 and the infrastructure 102 having mutually different billing systems.

The infrastructure 101 includes a key pair generation unit 10 that pairs the infrastructure 101 with the infrastructure 102, and that generates a key pair including a private key used in the infrastructure 101 and a public key used in the infrastructure 102.

Additionally, the infrastructure 101 includes a deployment operation transfer unit 12 and a constituent element insertion unit 13. The deployment operation transfer unit 12 uses a private key to transfer, to the infrastructure 102, an application definition input to a container cluster in the infrastructure 101. The constituent element insertion unit 13 analyzes the application definition input to the container cluster 111 in the infrastructure 101, and generates a load balancer definition and a reverse proxy definition.

A constituent element insertion unit 22 (see FIG. 2) provided in the infrastructure 102 analyzes the application definition transferred by the deployment operation transfer unit 12 and generates a service definition.

According to an example embodiment of the present invention, an information processing system, an information processing method and an infrastructure that can appropriately perform load distribution can be provided.

The above-described information processing system 1 has a computer system contained therein. Furthermore, the steps in the processes performed by the above-mentioned information processing system 1 are stored in a computer-readable recording medium in the form of a program, and the above-mentioned processes are performed by a computer reading out and executing this program. In this case, the computer-readable recording medium refers to a magnetic disk, a magneto-optic disk, a CD-ROM, a DVD-ROM, a semiconductor memory device, or the like. Additionally, this computer program may be transmitted to a computer by means of a communication line and the computer that has received this transmission may execute said program.

All or some of the functions of the units provided in the information processing system 1 according to the above-described example embodiments may be realized by recording a program for realizing these functions on a computer-readable recording medium, reading the program recorded on this recording medium into a computer system, and executing the program. In this case, the "computer system" includes an OS and hardware such as peripheral devices. Additionally, the "computer system" also includes web-based systems provided with a homepage-presenting environment (or a display environment). Additionally, the "computer-readable recording medium" refers to a portable medium such as a flexible disk, a magneto-optic disk, a ROM or a CD-ROM, or to a storage device, such as a hard disk, that is internal to a computer system. Furthermore, the "computer-readable recording medium" includes media that hold the program for a certain time, such as volatile memory (RAM) in a computer system serving as a server or a client when the program is transmitted via a network, such as the internet, or via a communication line, such as a telephone line.

Additionally, the above-mentioned program may be transmitted from a computer system storing this program in a storage device or the like to another computer system via a transmission medium or by means of transmission waves in a transmission medium. In this case, the "transmission medium" for transmitting the program refers to a medium having the function of transmitting information, as in a network (communication network) such as the internet, or a communication line (communication line) such as a telephone line. Additionally, the above-mentioned program may be for realizing a portion of the aforementioned functions. Furthermore, it may be a so-called difference file (difference program) that can realize the aforementioned functions by being combined with a program that is already recorded in a computer system.

In addition thereto, the constituent elements in the above-mentioned example embodiments may be appropriately replaced with known constituent elements within a range not departing from the spirit of the present invention. Additionally, the technical scope of this invention is not limited to the above-mentioned example embodiments, and various modifications may be made within a range not departing from the spirit of the present invention.

The whole or part of the example embodiments disclosed above can be described as, but not limited to, the following supplementary notes.

(Supplementary Note 1)

An information processing system for performing load distribution across a first infrastructure and a second infrastructure having mutually different billing systems, wherein the first infrastructure comprises: at least one memory configured to store first instructions; and at least one processor configured to execute the first instructions to: pair the first infrastructure with the second infrastructure, and generate a key pair including a private key used in the first infrastructure and a public key used in the second infrastructure; transfer, to the second infrastructure, an application definition input to a container cluster in the first infrastructure, by using the private key; and analyze the application definition input to the container cluster in the first infrastructure to generate a load balancer definition and a reverse proxy definition, and the second infrastructure comprises: at least one memory configured to store second instructions; and at least one processor configured to execute the second instructions to: analyze the transferred application definition to generate a service definition.

(Supplementary Note 2)

The information processing system according to supplementary note 1, wherein the application definition input to the container cluster in the first infrastructure and the application definition transferred to the second infrastructure include a setting for load distribution across the first infrastructure and the second infrastructure.

(Supplementary Note 3)

The information processing system according to supplementary note 1, wherein the at least one processor of the first infrastructure is configured to execute the first instructions to: deploy an application by applying the application definition to the container cluster in the first infrastructure, and the at least one processor of the second infrastructure is configured to execute the second instructions to: deploy an application by applying, to a container cluster in the second infrastructure, the transferred application definition.

(Supplementary Note 4)

The information processing system according to supplementary note 1, wherein the at least one processor of the first infrastructure is configured to execute the first instructions to: monitor an access log output by a load balancer in the container cluster in the first infrastructure; and perform load distribution across the first infrastructure and the second infrastructure by using an average value of a response time.

(Supplementary Note 5)

The information processing system according to supplementary note 4, wherein the application definition input to the container cluster in the first infrastructure and the application definition transferred to the second infrastructure include a Pod1 and a Pod2, of the Pod1 and the Pod2, only the Pod2 includes a setting for load distribution across the first infrastructure and the second infrastructure, and the at least one processor of the first infrastructure is configured to execute the first instructions to: acquire the access log output by the load balancer in the container cluster in the first infrastructure in each prescribed monitoring unit time; and calculate the average value of the response time in the monitoring unit time in the Pod2 deployed in the container cluster in the first infrastructure.

(Supplementary Note 6)

The information processing system according to supplementary note 5, wherein when the calculated average value of the response time in the monitoring unit time in the Pod2 is greater than a prescribed expansion threshold value, if the Pod2 does not exist in a container cluster in the second infrastructure, then the information processing system generates the Pod2 in a container cluster in the second infrastructure.

(Supplementary Note 7)

The information processing system according to supplementary note 5, wherein when the calculated average value of the response time in the monitoring unit time in the Pod2 is greater than a prescribed expansion threshold value, if the Pod2 exists in a container cluster in the second infrastructure, then the information processing system increments a multiplicity of the Pod2 in the container cluster in the second infrastructure.

(Supplementary Note 8)

The information processing system according to supplementary note 5, wherein when the calculated average value of the response time in the monitoring unit time in the Pod2 is less than a prescribed contraction threshold value, if the Pod2 exists in a container cluster in the second infrastructure, then the information processing system decrements a multiplicity of the Pod2 in the container cluster in the second infrastructure, or when the multiplicity of the Pod2 in the container cluster in the second infrastructure cannot be decremented, deletes the Pod2 from the container cluster in the second infrastructure.

(Supplementary Note 9)

The information processing system according to supplementary note 1, wherein the application definition input to the container cluster in the first infrastructure and transferred to the second infrastructure includes a setting for load distribution across the first infrastructure and the second infrastructure.

(Supplementary Note 10)

The information processing system according to supplementary note 9, wherein the application definition input to the container cluster in the first infrastructure and transferred to the second infrastructure includes a Pod1 and a Pod2, and of the Pod1 and the Pod2, only the Pod2 includes the setting for load distribution across the first infrastructure and the second infrastructure.

(Supplementary Note 11)

The information processing system according to supplementary note 10, wherein, of the Pod1 and the Pod2, the load balancer definition corresponds to the Pod2 which includes the setting for load distribution across the first infrastructure and the second infrastructure.

(Supplementary Note 12)

The information processing system according to supplementary note 1, wherein the reverse proxy definition is used for transferring, to the second infrastructure, the application definition input to the container cluster in the first infrastructure.

(Supplementary Note 13)

The information processing system according to supplementary note 10, wherein, of the Pod1 and the Pod2, the service definition corresponds to the Pod2 which includes the setting for load distribution across the first infrastructure and the second infrastructure.

(Supplementary Note 14)

The information processing system according to supplementary note 13, wherein the at least one processor of the second infrastructure is configured to execute the second instructions to set the Pod2 which includes the setting for load distribution across the first infrastructure and the second infrastructure, to a multiplicity of 1, and delete a definition of the Pod1 which does not include the setting for load distribution across the first infrastructure and the second infrastructure.

(Supplementary Note 15)

The information processing system according to supplementary note 3, wherein the at least one processor of the first infrastructure is configured to execute the first instructions to generate the load balancer definition and the reverse proxy definition before deploying the application, and the at least one processor of the second infrastructure is configured to execute the second instructions to generate the service definition before deploying the application.

(Supplementary Note 16)

An information processing method for performing load distribution across a first infrastructure and a second infrastructure with mutually different billing systems, comprising: pairing, by the first infrastructure, the first infrastructure with the second infrastructure; generating, by the first infrastructure, a key pair including a private key used in the first infrastructure and a public key used in the second infrastructure; transferring, by the first infrastructure, to the second infrastructure, an application definition input to a container cluster in the first infrastructure, by using the private key; analyzing, by the first infrastructure, the transferred application definition input to the container cluster in the first infrastructure to generate a load balancer definition and a reverse proxy definition; and analyzing, by the first infrastructure, the transferred application definition to generate a service definition.

(Supplementary Note 17)

An infrastructure included in an information processing system that performs load distribution across the infrastructure and another infrastructure with mutually different billing systems, the infrastructure comprising: at least one memory configured to store instructions; and at least one processor configured to execute the instructions to: pair the infrastructure with the other infrastructure, and generate a key pair including a private key used in the infrastructure and a public key used in the other infrastructure; transfer, to the other infrastructure, an application definition input to a container cluster in the infrastructure, by using the private key; and analyze the application definition input to the container cluster in the infrastructure to generate a load balancer definition and a reverse proxy definition, wherein the other infrastructure comprises: at least one memory configured to store second instructions; and at least one processor configured to execute the second instructions to: analyze the transferred application definition to generate a service definition.

What is claimed is:

1. An information processing system for performing load distribution across a first infrastructure and a second infrastructure having mutually different billing systems, wherein the first infrastructure comprises:
at least one memory configured to store first instructions; and
at least one processor configured to execute the first instructions to:
pair the first infrastructure with the second infrastructure, and generate a key pair including a private key used in the first infrastructure and a public key used in the second infrastructure;
transfer, to the second infrastructure, an application definition input to a container cluster in the first infrastructure, by using the private key; and
analyze the application definition input to the container cluster in the first infrastructure to generate a load balancer definition and a reverse proxy definition, and
the second infrastructure comprises:
at least one memory configured to store second instructions; and
at least one processor configured to execute the second instructions to:
analyze the transferred application definition to generate a service definition,
wherein the at least one processor of the first infrastructure is configured to execute the first instructions to further:
monitor an access log output by a load balancer in the container cluster in the first infrastructure; and
perform load distribution across the first infrastructure and the second infrastructure by using an average value of a response time.

2. The information processing system according to claim 1,
wherein the application definition input to the container cluster in the first infrastructure and the application definition transferred to the second infrastructure include a Pod1 and a Pod2,
of the Pod1 and the Pod2, only the Pod2 includes a setting for load distribution across the first infrastructure and the second infrastructure, and
the at least one processor of the first infrastructure is configured to execute the first instructions to further:
acquire the access log output by the load balancer in the container cluster in the first infrastructure in each prescribed monitoring unit time; and
calculate the average value of the response time in the monitoring unit time in the Pod2 deployed in the container cluster in the first infrastructure.

3. The information processing system according to claim 2, wherein
when the calculated average value of the response time in the monitoring unit time in the Pod2 is greater than a prescribed expansion threshold value,
if the Pod2 does not exist in a container cluster in the second infrastructure,
then the information processing system generates the Pod2 in a container cluster in the second infrastructure.

4. The information processing system according to claim 2, wherein
when the calculated average value of the response time in the monitoring unit time in the Pod2 is greater than a prescribed expansion threshold value,
if the Pod2 exists in a container cluster in the second infrastructure,
then the information processing system increments a multiplicity of the Pod2 in the container cluster in the second infrastructure.

5. The information processing system according to claim 2, wherein
when the calculated average value of the response time in the monitoring unit time in the Pod2 is less than a prescribed contraction threshold value,
if the Pod2 exists in a container cluster in the second infrastructure,
then the information processing system decrements a multiplicity of the Pod2 in the container cluster in the second infrastructure, or when the multiplicity of the Pod2 in the container cluster in the second infrastructure cannot be decremented, deletes the Pod2 from the container cluster in the second infrastructure.

6. An information processing method for performing load distribution across a first infrastructure and a second infrastructure with mutually different billing systems, comprising:
pairing, by the first infrastructure, the first infrastructure with the second infrastructure;
generating, by the first infrastructure, a key pair including a private key used in the first infrastructure and a public key used in the second infrastructure;
transferring, by the first infrastructure, to the second infrastructure, an application definition input to a container cluster in the first infrastructure, by using the private key;
analyzing, by the first infrastructure, the transferred application definition input to the container cluster in the first infrastructure to generate a load balancer definition and a reverse proxy definition;
analyzing, by the second first infrastructure, the transferred application definition to generate a service definition;
monitoring, by the first infrastructure, an access log output by a load balancer in the container cluster in the first infrastructure; and
performing, by the first infrastructure, load distribution across the first infrastructure and the second infrastructure by using an average value of a response time.

7. An infrastructure included in an information processing system that performs load distribution across the infrastructure and another infrastructure with mutually different billing systems, the infrastructure comprising:
at least one memory configured to store first instructions; and
at least one processor configured to execute the first instructions to:
pair the infrastructure with the other infrastructure, and generate a key pair including a private key used in the infrastructure and a public key used in the other infrastructure;
transfer, to the other infrastructure, an application definition input to a container cluster in the infrastructure, by using the private key; and
analyze the application definition input to the container cluster in the infrastructure to generate a load balancer definition and a reverse proxy definition,
wherein the other infrastructure comprises:
at least one memory configured to store second instructions; and
at least one processor configured to execute the second instructions to:
analyze the transferred application definition to generate a service definition,
wherein the at least one processor of the infrastructure is configured to execute the first instructions to further:

monitor an access log output by a load balancer in the container cluster in the infrastructure; and
perform load distribution across the infrastructure and the other infrastructure by using an average value of a response time.

* * * * *